United States Patent [19]
Kim et al.

[11] Patent Number: 5,976,241
[45] Date of Patent: Nov. 2, 1999

[54] ACTIVATED KAOLIN POWDER COMPOUND FOR MIXING WITH CEMENT AND METHOD OF PREPARING THE SAME

[75] Inventors: Moon Han Kim, Mokdong Apt. 1401-903, Mok-dong, Yangchen-ku, Seoul; Hey Zoo Hwang, Seoul; Jung Ha Hwang, Seoul; Hee Sung Cha, Seoul; Kwang Choon Kim, Seoul; Jong Kuk Lee, Seoul, all of Rep. of Korea

[73] Assignees: Moon Han Kim; Jeong Hwan Kwak, both of Seoul, Rep. of Korea

[21] Appl. No.: 08/925,951

[22] Filed: Sep. 8, 1997

[30] Foreign Application Priority Data

Sep. 9, 1996 [KR] Rep. of Korea ............... 1996-38841

[51] Int. Cl.$^6$ .................................................. C04B 14/00
[52] U.S. Cl. ...................... 106/718; 106/706; 106/718; 106/811; 501/144; 501/145
[58] Field of Search .................... 501/144, 145, 501/149, 150; 106/718, 811, 706

[56] References Cited

U.S. PATENT DOCUMENTS 4,640,715  2/1987  Heitzmann et al. .................. 106/706

FOREIGN PATENT DOCUMENTS 6-271350  9/1994  Japan .
1074280  7/1967  United Kingdom .

OTHER PUBLICATIONS

"Study of Kaolinite Disordered by Quenching" Mannan et al. Indian Journal of Physics (1987), 61A, (6) pp. 535–542.

*Primary Examiner*—Paul Marcantoni
*Attorney, Agent, or Firm*—Dickinson Wright PLLC

[57] ABSTRACT

The activated kaolin powder compound is prepared from naturally-existing kaolin (hereinafter "natural kaolin"). The activated kaolin powder compound is prepared by heating natural kaolin to 480° C. within at most one hour, calcinating the heated kaolin at high temperature by heating to 980° C. over at least one hour, quenching the calcinated kaolin with water or air, and pulverizing the quenched kaolin to give particle sizes of 2 μm or less. The activated kaolin powder compound is employed in an amount of about 5 to 15% by weight of cement for preparing mortar or cement. The cement composition containing the activated kaolin powder compound can provide a mortar or concrete having superior properties in compressive strength, flexural strength and water permeability.

12 Claims, 3 Drawing Sheets

ACTIVATED KAOLIN POWDER COMPOUND FOR MIXING WITH CEMENT AND METHOD OF PREPARING THE SAME

FIELD OF THE INVENTION

The present invention relates to an activated kaolin powder compound for mixing with cement. More particularly, this invention relates to an activated kaolin powder compound for mixing with cement so as to provide mortar or concrete having good physical properties in strength, water permeability, etc. This invention also relate to a method of preparing the activated kaolin powder compound.

BACKGROUND OF THE INVENTION

In general, mortar or concrete using cement requires excellent strength and water permeability. A number of various researches have been carried out to prepare mortar or concrete having excellent physical properties in strength, water permeability, etc. For this purpose, many researches have been continued both in the field of cement and in the field of other mixing components used with the cement. As one of the mixing components, silica fume has been developed to prepare mortar or concrete having excellent physical properties in strength, water permeability, etc. when it is used with cement. However, the silica fume is very expensive and cannot be widely used at present.

Accordingly, the present inventors have developed an activated kaolin powder compound for using with cement so that the mortar or concrete prepared from the composition of cement and the activated kaolin powder shows good properties in strength and water permeability. The kaolin is naturally buried under the ground and can be obtained in a much lower cost than the silica fume.

OBJECTS OF THE INVENTION

An object of the present invention is to provide an activated kaolin powder compound which can be used with cement.

Another object of the invention is to provide an activated kaolin powder compound to prepare mortar or concrete having good properties in strength and water permeability, when the activated kaolin powder compound is together used with cement.

A further object of the invention is to provide a method of preparing an activated kaolin powder compound from a naturally-existing kaolin.

A still further object of the invention is to provide mortar or concrete having excellent strength and water permeability, which can be prepared by using an activated kaolin powder compound of this invention in a lower cost.

The foregoing and other objects of the present invention will be achieved in the following description.

SUMMARY OF THE INVENTION

The activated kaolin powder compound is prepared from naturally-existing kaolin (hereinafter "natural kaolin"). The activated kaolin powder compound is prepared by heating natural kaolin to 480° C. within at most one hour, calcinating the heated kaolin at high temperature by heating to 980° C. over at least one hour, quenching the calcinated kaolin with water or air, and pulverizing the quenched kaolin to give particle sizes of 2 $\mu$m or less.

The activated kaolin powder compound is employed in an amount of about 5 to 15% by weight of cement for preparing mortar or cement.

The cement composition containing the activated kaolin powder compound can provide a mortar or concrete having superior properties in compressive strength, flexural strength and water permeability.

BRIEF DESCRIPTION OF THE DRAWINGS

The present invention will be more fully understood by reference to the following detailed description of the preferred embodiment of the present invention when read in conjunction with the accompanying drawings.

DETAILED DESCRIPTION OF THE PREFERRED EMBODIMENTS

Figure 1:
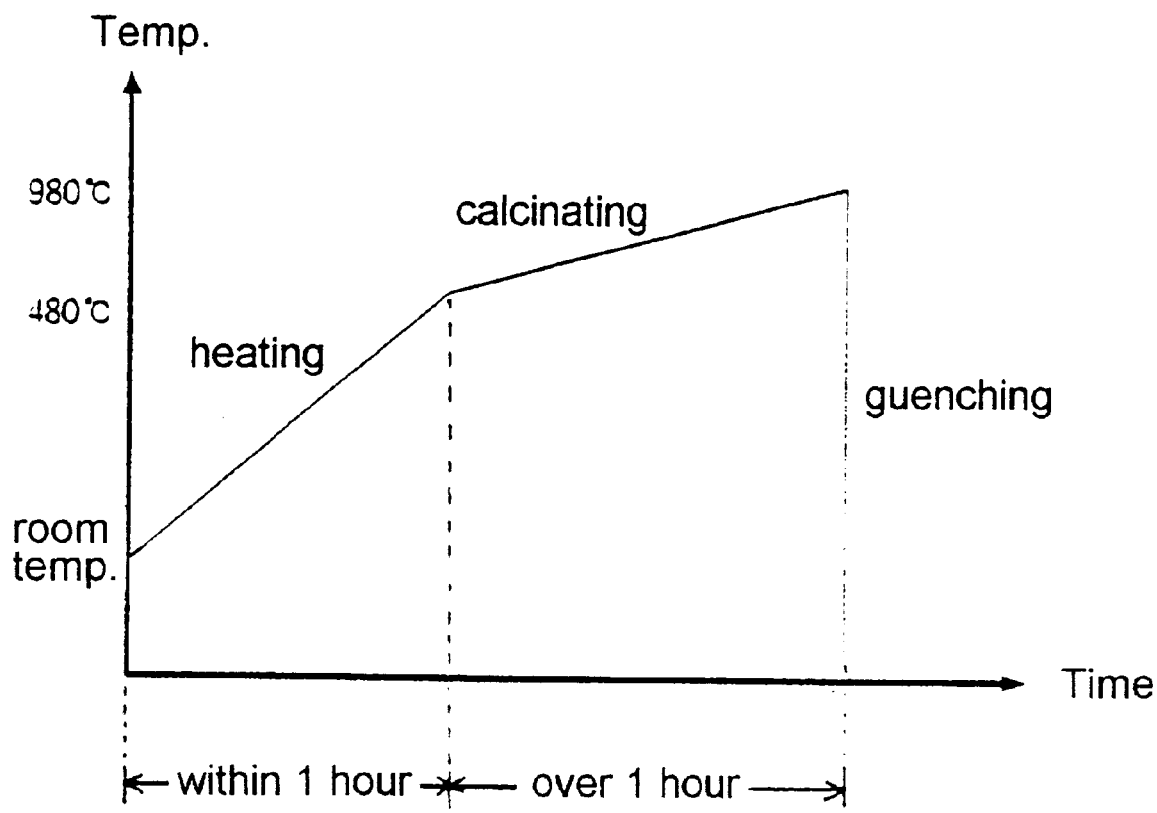
FIG. 1 is a schematic graph showing the relationship of temperature with heating and calcinating times in the process of preparing an activated kaolin powder compound according to the present invention.

The present invention utilizes natural kaolin which is buried under the ground in an tremendous amount. The natural kaolin is activated for use mixing with cement in this invention. The natural kaolin has been used for manufacturing pottery, porcelain, china etc. In this invention, an activated kaolin powder has been developed from the natural kaolin, which is capable of being used as one of composite materials for mortar or concrete. The activated kaolin powder is prepared by heating natural kaolin to a certain temperature, calcinating the heated kaolin at high temperature, quenching the calcinated kaolin with water or air, and pulverizing the quenched kaolin in a form of powder.

Generally, activation of a mineral compound means a state wherein a large amount of crystallization energy is reserved in the molecular structure of the mineral compound when energy is applied to the mineral compound and then the mineral material is quenched, and wherein the mineral compound is in a free state having a strong chemical bonding ability due to the reserved crystallization energy when an external force is applied to the mineral compound.

When the natural kaolin is calcinating at high temperature and quenched, the kaolin reserves a large amount of crystallization energy in the molecular structure and has a latent hydraulicity, because the kaolin molecules are in a free state. In other words, although the activated kaolin has a high reaction activity and does not cause a hydration when the kaolin contacts with water, the kaolin shows a significant water-setting under a certain circumstance, for instance, in an alkali state. Such water-setting is called as "latent hydoraulicity". The present invention is to provide a natural kaolin with the latent hydraulicity by activation, and to cause a mechanism for hydration and pozzolan reaction of the activated kaolin under a certain circumstance such as in mortar or in concrete.

The activated kaolin according to the present invention and $Ca(OH)_2$ from cement causes a pozzolan reaction, and the mortar or concrete using the activated kaolin has excellent strength and water permeability due to the latent hydraulicity.

A bleeding or segregation phenomenon can be improved when a fine particle component is added to a mortar or concrete, which is called as "stabilizing effect". In this invention, the activated kaolin powder causes the stabilizing effect. When the activated kaolin powder is added to a mortar or concrete, the bleeding or segregation phenomenon of the composition is reduced. Thus, the activated kaolin powder of this invention can cause an excellent stabilizing effect when the activated kaolin powder is together used with mortar or cement. This is believed because the activated kaolin powder fills the porosities of cement particles or reduces the porosity sizes, and because the activated kaolin powder increases the surface of cement paste and aggregate thereby increasing the bonding force of mortar or cement.

The activated kaolin powder compound is prepared from natural kaolin. The activated kaolin powder compound is prepared by heating natural kaolin to 480° C. within at most one hour, calcinating the heated kaolin at high temperature by heating to 980° C. over at least one hour, quenching the calcinated kaolin with water or air, and pulverizing the quenched kaolin to give particle sizes of 2 μm or less.

FIG. 1 is a schematic graph showing the relationship of temperature with heating and calcinating times in the process of preparing an activated kaolin powder compound according to the present invention.

As shown in FIG. 1, the natural kaolin which is dried at ambient temperature is heated to 480° C. It is preferable to heat the natural kaolin within one hour in aspect of heat efficiency and energy consumption.

The heated kaolin is calcinated to 980° C. through heating slowly. In this calcinating step, it is preferable to calcinate the heated kaolin over at least one hour so at to calcinate the inner part of the kaolin uniformly. For excellent physical properties of the activated kaolin powder compound, the calcinating step should be conducted for one hour or more. However, the heat efficiency and amount of energy used should be considered. In this calcinating step, the temperature should be lower than 980° C., because the physical properties can be adversely affected at the higher temperature than 980° C.

The calcinated kaolin is quenched with water or air. The quenching step using water is more effective in cost than the step using air. Through the quenching step, the kaolin is in an activation state which reserves crystallization energy therein.

The quenched kaolin is pulverized in a form of powder to give particle sizes of 2 μm or less. Kaolin particles having about 1 μm are preferably used. The pulverized kaolin powder has a specific gravity of about from 1.5 to 3.0.

The activated kaolin powder compound is employed in an amount of about 5 to 15% by weight of cement for preparing mortar or cement. It is preferable to employ the activated kaolin powder compound in an amount of about 10% by weight of the cement.

The activated kaolin powder compound is used for preparing mortar or concrete having excellent strength and water permeability, and being manufactured in an economical cost.

The invention may be better understood by reference to the following examples which are intended for purpose of illustration and are not to be construed as in any way limiting the scope of the present invention, which is defined in the claims appended.

EXAMPLE

Preparation of Activated Kaolin Powder:

Ambient temperature dried natural kaolin of 500 g was heated to 480° C. in a furnace over 40 minutes. The heated kaolin was calcinated to reach 980° C. over 90 minutes. The calcinated kaolin was quenched with water to prepare an activated kaolin compound. The activated kaolin compound was pulverized with a pulverizer. The activated kaolin powder having an average particle size of 1.2 μm and a specific gravity of 2.55 was obtained.

Analysis of Activated Kaolin and Natural Kaolin:

The reaction tests of the kaolin with an alkali solution and X-ray diffraction analysis were carried out for the activated kaolin above and natural kaolin.

(1) Reaction tests of the kaolin with $Ca(OH)_2$ solution and phenolphthalein solution Activated kaolin was added to a saturated solution of $Ca(OH)_2$ and tested with an indicating agent of phenolphthalein solution. Activated kaolin reacted with $Ca(OH)_2$. As $Ca(OH)_2$ did not exist in the solution any more, the solution by reaction of phenolphthalein solution appeared white.

Unactivated kaolin was added to a saturated solution of $Ca(OH)_2$ and tested with an indicating agent of phenolphthalein solution. Unactivated kaolin did not react with $Ca(OH)_2$. As $Ca(OH)_2$ existed in the solution, the solution by reaction of phenolphthalein solution appeared red.

From these reaction tests, it is believed that the kaolin according to the present invention was activated.

(2) X-ray Diffraction Analysis

Figure 2:
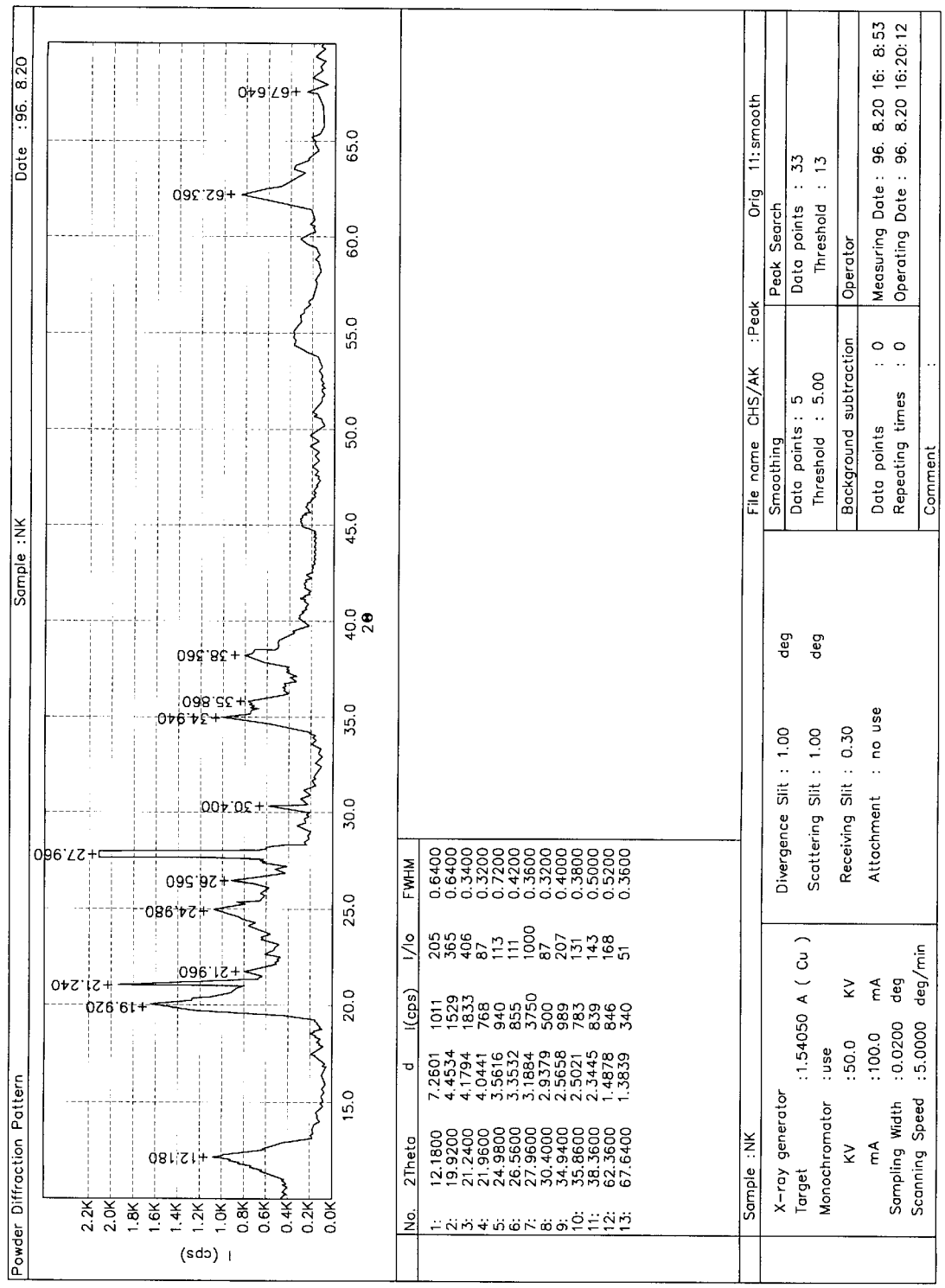
FIG. 2 is a graph showing an X-ray diffraction pattern of an unactivated kaolin powder (natural kaolin powder)
Figure 3:
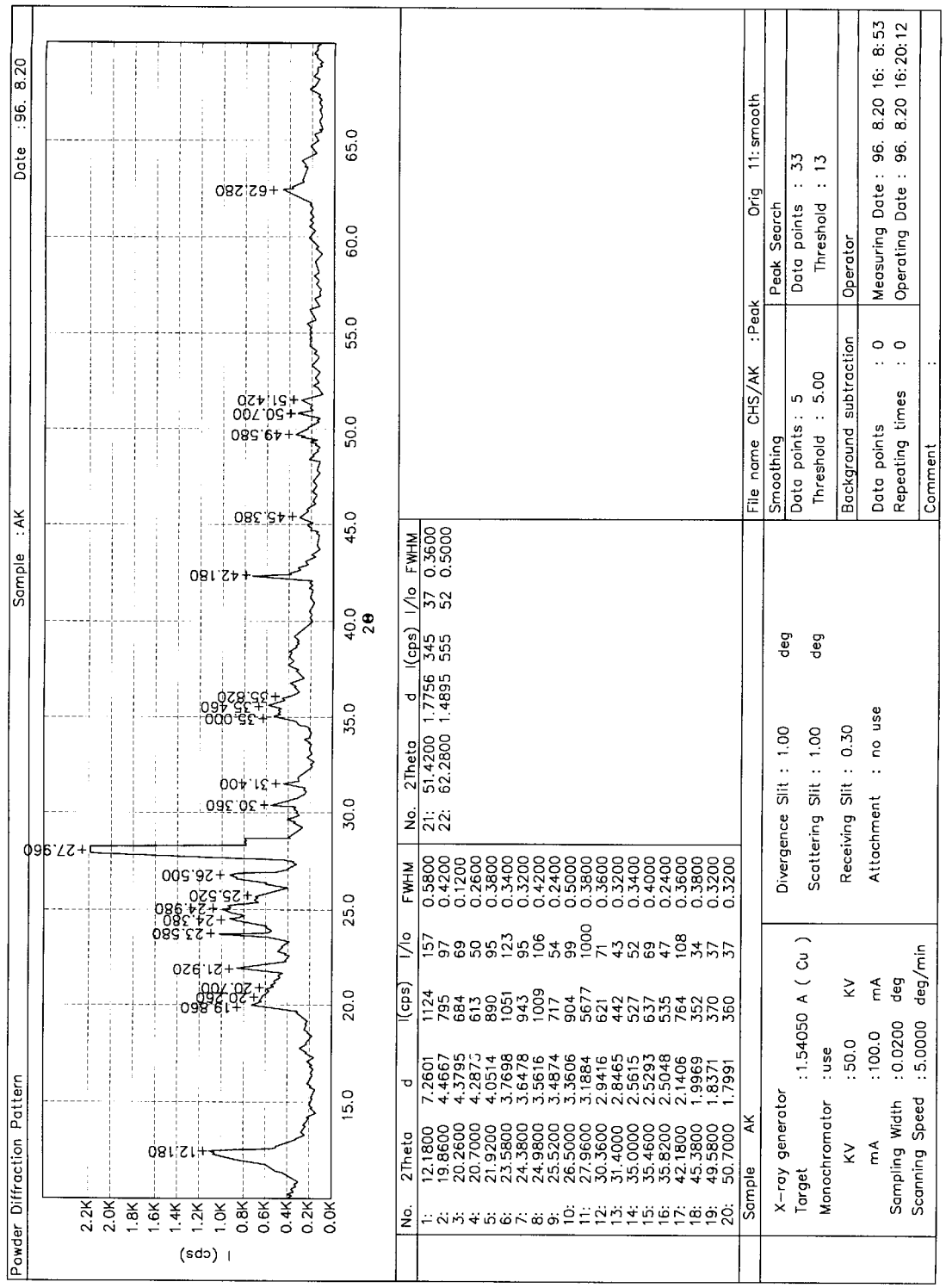
FIG. 3 is a graph showing an X-ray diffraction pattern of an activated kaolin powder according to the present invention.

X-ray diffraction analysis were conducted for unactivated (natural) kaolin powder and the activated kaolin powder according to the present invention. FIG. 2 is a graph showing an X-ray diffraction pattern of an unactivated kaolin powder (natural kaolin powder), and FIG. 3 is a graph showing an X-ray diffraction pattern of an activated kaolin powder according to the present invention. From the X-ray diffraction patterns, it is known that the activated kaolin is in a free state of noncrystalline, which will show a latent water-setting ability.

Preparation of Specimens of Mortar:

The activated kaolin powder prepared as above, cement, sands and a superplasticizer were mixed to give mortar. The composition of mortar are described in the following Example and Comparative Examples. The cement has a specific surface of 3200 and a specific gravity of 3.28. The sands have a specific gravity of 2.61 and fine modulus of 2.71. The superplasticizer is a naphthalene compound having a specific gravity of 1.25.

EXAMPLE 1

Cement of 450 g, activated kaolin of 50 g, sands of 1,500 g, water of 250 g and superplasticizer of 5 g were mixed together. Specimens of mortar of 40×40×160 mm were prepared from the mixture. The specimens were wet-cured in a 3-in-1 mold for 24 hours, and water-cured for 28 days. Three specimens (Specimens I, II and III) were prepared.

COMPARATIVE EXAMPLE 1

A conventional mortar was prepared. Cement of 500 g, sands of 1,500 g, water of 250 g and superplasticizer of 5 g were mixed together. Specimens of mortar of 40×40×160 mm were prepared from the mixture. The specimens were wet-cured in a 3-in-1 mold for 24 hours, and water-cured for 28 days. Three specimens (Specimens I, II and III) were prepared.

COMPARATIVE EXAMPLE 2

Comparative Example 2 was performed as in Example 1 with the exceptions that unactivated kaolin of 50 g was employed instead of the activated kaolin of 50 g. Three specimens (Specimens I, II and III) were prepared.

Measurement of Physical properties:

Flexural strength, compressive strength and water permeability were measured for the specimens of Example 1 and Comparative Examples 1 and 2.

(1) Flexural Strength

Flexural strengths were measured according to Korean Industrial Standard KS L 5105. The distance of points was 100 mm and the applied force was 5 kg·force per second. The strengths of the specimens were shown in Table 1.

TABLE 1 unit: kg/cm$^2$

|  | Specimen I | Specimen II | Specimen III | average |
|---|---|---|---|---|
| Example 1 | 85.6 | 89.1 | 86.6 | 87.1 |
| Comp. Example 1 | 75.8 | 76.4 | 75.3 | 75.8 |
| Comp. Example 2 | 55.4 | 53.1 | 56.7 | 55.1 |

As shown in Table 1, the mortar according to the present invention (Example 1) has an increase of 14.9% of the conventional mortar (Comparative Example 1) in flexural strength. The mortar using unactivated kaolin (Comparative Example 2) shows a decrease of 27.3% of the conventional mortar (Comparative Example 1) in flexural strength.

(2) Compressive Strength

Compressive strengths were measured according to KS L 5105. The applied force was 80 kg·force per second. After measurement of the flexural strength, six specimens per Example were tested. The compressive strengths of the specimens were shown in Table 2.

TABLE 2 unit: kg/cm$^2$

| | Specimens | | | | | | |
|---|---|---|---|---|---|---|---|
|  | 1 | 2 | 3 | 4 | 5 | 6 | average |
| Example 1 | 952 | 958 | 934 | 923 | 942 | 933 | 947 |
| Comp. Example 1 | 786 | 780 | 756 | 751 | 720 | 725 | 753 |
| Comp. Example 2 | 682 | 690 | 702 | 710 | 623 | 629 | 686 |

As shown in Table 2, the mortar according to the present invention (Example 1) has an increase of 25.8% of the conventional mortar (Comparative Example 1) in compressive strength. The mortar using unactivated kaolin (Comparative Example 2) shows a decrease of 8.9% of the conventional mortar (Comparative Example 1) in compressive strength.

(3) Test of Water Permeability

Figure 4:
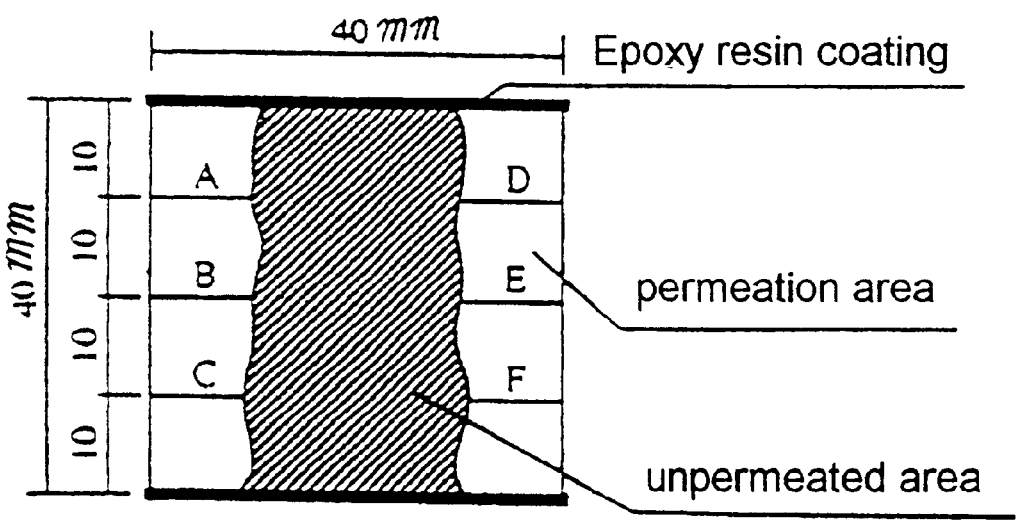
FIG. 4 is a cross-sectional view of a specimen of mortar for testing water permeability thereof, which is prepared in accordance with the present invention.

In this test of water permeability, a sodium chloride solution was used for measuring the permeation area where chlorine ions permeated. The test was performed in accordance with a test method of Japanese Concrete Institute (JCI). Specimens of 40×40×160 mm were immersed in a 2.5% sodium chloride solution at 20° C. for 7 days. The specimens were dissected into two pieces. On the dissected surfaces, 0.1% sodium fluorinate solution and 0.1N silver nitrate solution were sprayed. The fluorescent part on the dissected surface are deemed as permeation area. FIG. 4 is a cross-sectional view of a specimen of mortar for testing water permeability thereof, which is prepared in accordance with the present invention. The upper and bottom surfaces were coated with an epoxy resin not so as to permeate chlorine ions. Thus, chlorine ions permeate into the inner parts of the specimens through the side surfaces. The depths of the permeation area were measured at positions A through F. The depths of the permeation area at the positions were shown in Table 3.

TABLE 3 unit: mm

|  |  | Specimen I |  | Specimen II |  | Specimen III |  | Average |
|---|---|---|---|---|---|---|---|---|
| Example 1 | A | 10.2 | 9.3 | 8.9 | 9.8 | 10.2 | 9.4 | 9.5 |
|  | B | 9.4 |  | 10.7 |  | 8.6 |  |  |
|  | C | 8.5 |  | 8.5 |  | 8.5 |  |  |
|  | D | 8.1 |  | 10.1 |  | 9.3 |  |  |
|  | E | 10.0 |  | 9.9 |  | 10.7 |  |  |
|  | F | 9.6 |  | 10.7 |  | 9.1 |  |  |
| Comparative Example 1 | A | 13.3 | 14.5 | 15.3 | 15.0 | 13.9 | 14.9 | 14.8 |
|  | B | 14.7 |  | 16.0 |  | 15.8 |  |  |
|  | C | 15.3 |  | 14.7 |  | 14.9 |  |  |
|  | D | 15.4 |  | 14.2 |  | 16.0 |  |  |
|  | E | 13.5 |  | 16.0 |  | 13.7 |  |  |
|  | F | 14.8 |  | 13.8 |  | 15.1 |  |  |
| Comparative Example 2 | A | 13.3 | 14.6 | 15.5 | 16.3 | 15.5 | 15.0 | 15.3 |
|  | B | 14.8 |  | 16.1 |  | 13.6 |  |  |
|  | C | 15.9 |  | 17.4 |  | 15.0 |  |  |
|  | D | 15.4 |  | 15.2 |  | 16.4 |  |  |
|  | E | 13.5 |  | 16.5 |  | 16.0 |  |  |
|  | F | 14.7 |  | 17.1 |  | 13.5 |  |  |

As shown in Table 3, the mortar according to the present invention (Example 1) shows a decrease of 35.8% of the conventional mortar (Comparative Example 1) in depth of permeation area. The mortar using unactivated kaolin (Comparative Example 2) shows an increase of 3.4% of the conventional mortar (Comparative Example 1) in depth of permeation area. From the test of water permeability, the mortar or cement using the activated kaolin powder prepared in accordance with the present invention is effective to prevent impurities such as chlorine ions, due to excellent water permeability.

It is apparent from the above that many modifications and changes are possible without departing from the spirit and scope of the present invention.

What is claimed is:

1. A method of preparing an activated kaolin powder compound for mixing with cement, which comprises;

heating natural kaolin to 480° C. for a time period up to one hour;

calcinating the heated natural kaolin at high temperature by heating up to 980° C. over at least one hour;

quenching the calcinated kaolin to form the activated kaolin powder; and pulverizing the quenched activated kaolin powder to give particle sizes of 2 μm or less.

2. The method for preparing an activated kaolin powder compound according to claim 1 wherein the step of quenching is carried out with water or air.

3. The method for preparing an activated kaolin powder compound according to claim 1 wherein the particle sizes of the pulverized kaolin powder are in the range of about 0.5 to 1.5 μm.

4. An activated kaolin powder compound for mixing with cement for preparing mortar or concrete, having particle sizes of 2 μm or less and a specific gravity of about 1.5 to 3.0, which is prepared by heating natural kaolin to 480° C. for a time period up to one hour, calcinating the heated natural kaolin at high temperature by heating up to 980° C. over at least one hour, quenching the calcinated kaolin to form the activated kaolin powder, and pulverizing the quenched activated kaolin powder.

5. A cement composition for preparing mortar or concrete, which comprises:

a cement; and an activated kaolin powder compound having particle sizes of 2 $\mu$m or less and a specific gravity of about 1.5 to 3.0, which is prepared by heating natural kaolin to 480° C. for a time period up to one hour, calcinating the heated natural kaolin at high temperature by heating up to 980° C. over at least one hour, quenching the calcinated kaolin to form the activated kaolin powder, and pulverizing the quenched activated kaolin powder wherein the activated kaolin powder is employed in an amount of about 5 to 15% by weight of the cement.

6. A method for preparing a cement composition comprising:

producing an activated kaolin powder from natural kaolin by heating the natural kaolin powder to 480° C. for a time period of up to one hour;

calcinating the heated natural kaolin by heating up to 980° C. for at least one hour;

quenching the calcinated natural kaolin to form the activated kaolin powder;

pulverizing the quenched kaolin to give a particle size of two micron or less;

providing a cement; and mixing an amount of the activated kaolin powder with the cement to form the cement composition, wherein the activated kaolin powder is about 5 to 15 percent by weight of the cement amount.

7. The method of claim 6, wherein the calcinated natural kaolin is quenched in one of water and air.

8. The method of claim 6, wherein the particle size of the pulverized quenched activated kaolin powder is in the range from about 0.5 to 1.5 micron.

9. The method of claim 1, wherein the calcinating heating is to 980° C.

10. The method of claim 6, wherein the calcinating heating is to 980° C.

11. The powder of claim 4, wherein the calcinating heating is to 980° C.

12. The composition of claim 5, wherein the calcinating heating is to 980° C.

* * * * *